United States Patent Office 3,331,448
Patented July 18, 1967

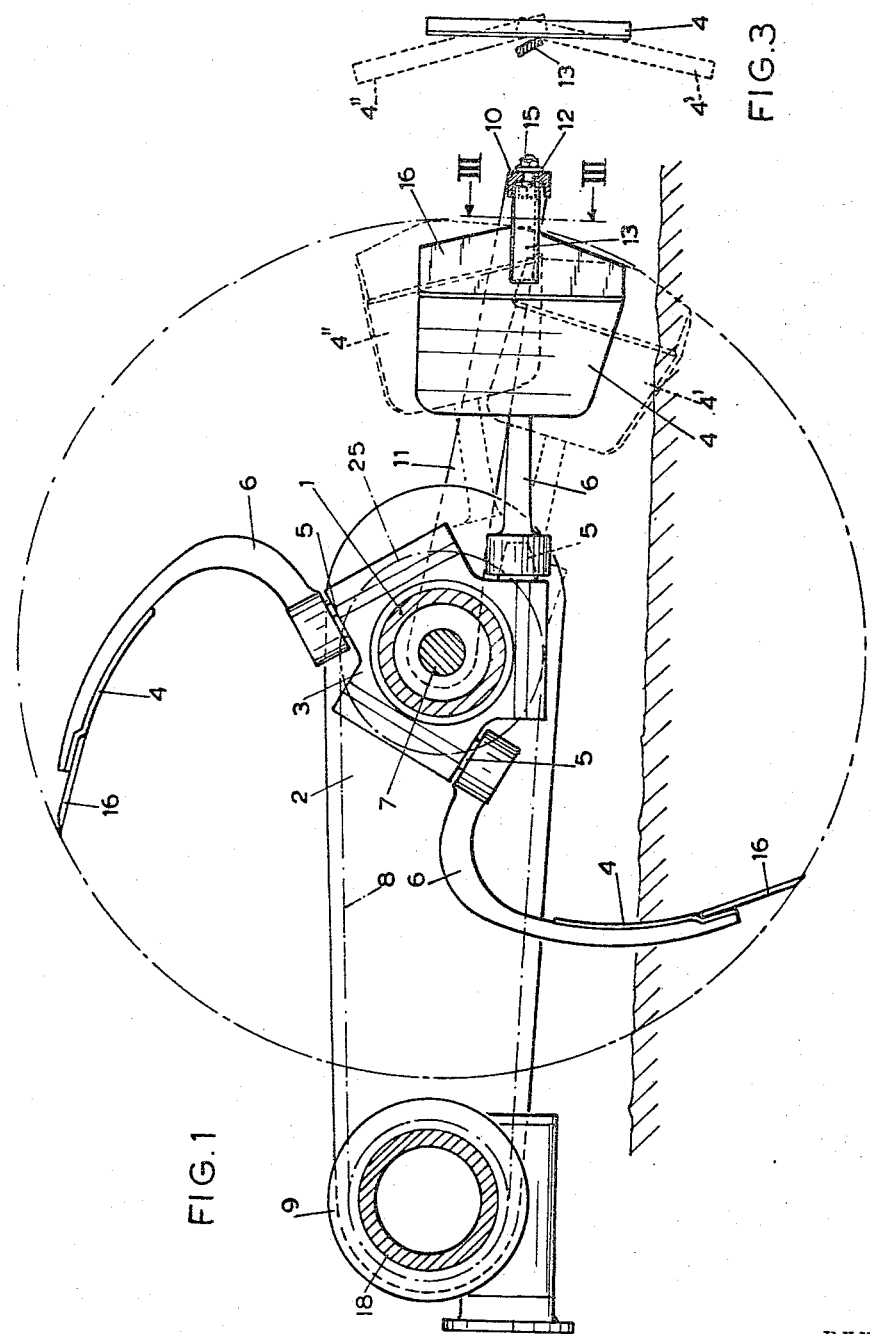

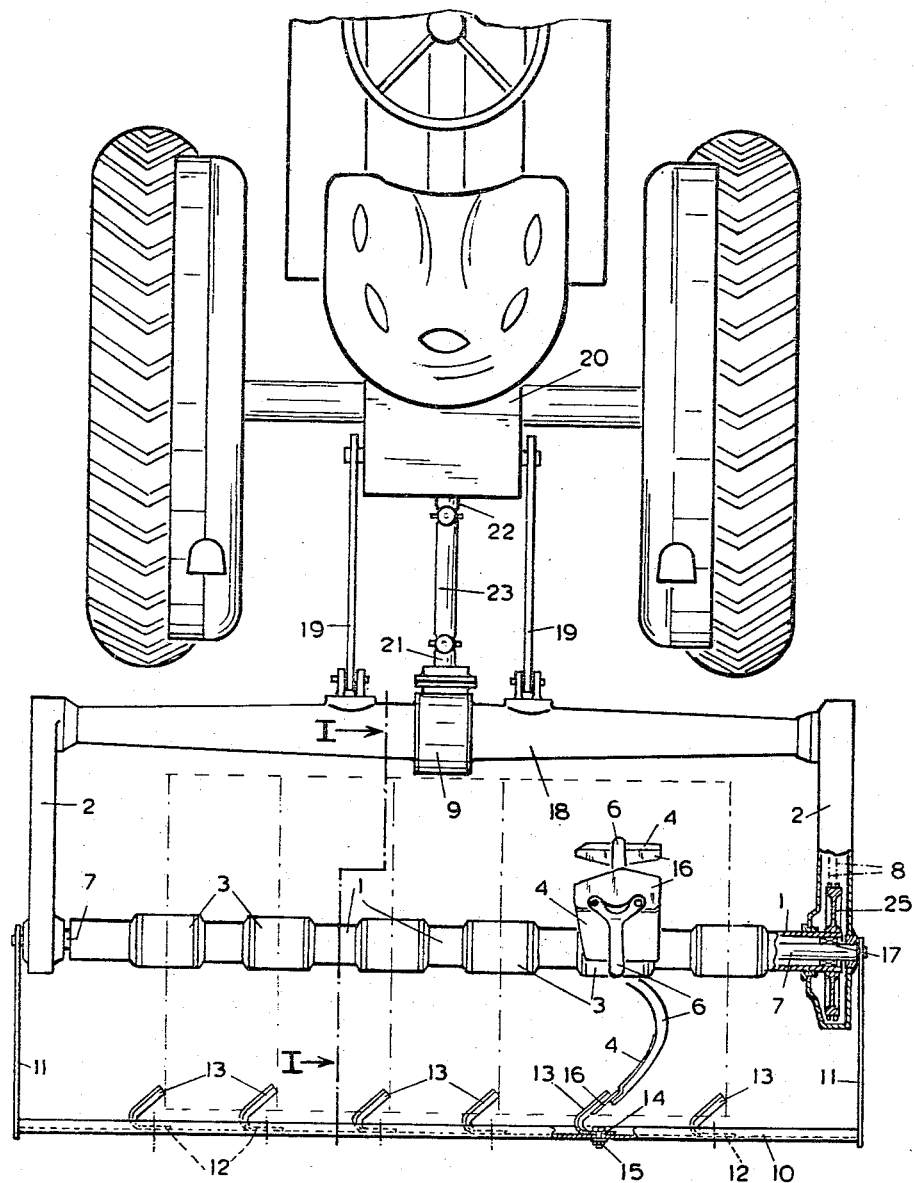

3,331,448
MACHINES FOR CULTIVATING THE SOIL
Herbert Vissers, Nieuw Vennep, Netherlands, assignor to Landbouwwerktuigen- en Machinenfabriek H. Vissers N.V., Nieuw Vennep, Netherlands, a company of the Netherlands
Filed Oct. 6, 1964, Ser. No. 401,890
Claims priority, application Netherlands, Oct. 24, 1963, 299,662
4 Claims. (Cl. 172—39)

This invention relates to a machine for cultivating the soil provided with digging blades arranged in one or more circular sets side by side on a horizontal axis and each blade being tiltable about an axis perpendicular to the axis of rotation of the set.

With an arrangement of this kind the slice of soil taken up by the blade is released from the blade by the tilting movement, whereby the blade after having taken up the slice of soil reaches a vertical position. It is an object of the invention to provide a stationary scraper or striker adapted to further release the slice of soil from the blade and to also clean the outer part of the blade at its cutting edge.

According to the invention, for the set or for each set of blades a more or less resilient scraper is secured on the frame behind the set and the blade in its tilted position moves in contact with the scraper during rotation of the set of blades in such a manner that the scraper scrapes on the front side of the blade along its cutting edge in the direction of said edge according to the transverse direction of the blade. When now on rotation of the set the blade during its tilting movement comes into contact with the scraper the tilting blade due to the resiliency of the scraper may cause the scraper to yield, whilst the scraper still remains into contact with the blade for exerting its scraping action for removing parts of stalks from the cutting edge.

The invention will further be described with reference to the accompanying drawings showing an embodiment of the device according to the invention.

In the drawing:

FIG. 1 is a longitudinal section of a machine embodying the invention taken along the line I—I of FIG. 2, which itself is a diagrammatic plan view of the machine shown in FIG. 1.

FIG. 3 is a sectional view of the scraper taken on line III—III of FIG. 1.

The hollow shaft 1 by means of bearings 17 is journalled on a stationary axle 7 which at its ends is secured in cheeks 2 rigidly connected to a transverse beam 18. Said beam 18 by means of links 19 is attached to a tractor 20 and comprises a gear box 9, having its input shaft 21 connected to the power take-off shaft 22 of the tractor by a coupling shaft 23. The rotation of the input shaft 21 is transmitted to a chain drive 8 by means of a gear located in the hollow beam 18 and not shown in the drawing. The chain drive 8 is located in the box-like cheek 2 and comprises a sprocket 25 secured to the hollow shaft 1.

The hollow shaft 1 carries for each set of digging blades a hub body 3. With the embodiment shown in the drawing the hub body carries three digging blades 4 which with a stub shaft 5 secured to the arm 6 of the blade are rotatably supported in said body. The tilting movement of the digging blades 4 by the rotating movement of the hub body 3 is derived from the stationary axle 7 in known manner, e.g. such as described in my patent application 372,882 of June 5, 1964, now Patent No. 3,199,606.

Behind the set of digging blades a holder 10 through the intermediary of arms 11 is supported which for each set of blades carries a scraper 12. The active part 13 is angularly bent at the scraper 12 as a leg and the other leg of the scraper has a slot 14 for a bolt 15 serving to secure the scraper to the holder 10, so that the scraper may be adjusted with respect to the digging blades.

As appears from FIG. 3 the active part 13 of the scraper is obliquely directed with respect to the blade to be cleaned and the scraper cooperates with the outer part 16 of the blade at which the cutting edge is provided.

In the dotted line position 4' of the digging blade shown in FIG. 1 the blade starts to contact the scraper and upon further movement the blade reaches its vertical position shown in full lines. The scraper 13 thus remains operative until the blade reaches the dotted line position 4". As the active part 13 of the scraper at the tilting movement of the blade will resiliently yield an efficient contact of the scraping part 13 with the blade is always secured.

What I claim is:

1. In a rotary cultivator of the type including a frame supporting a shaft transverse to the direction of movement and rotatably supporting at least one circular set of revolvable cultivator arms, said arms having at their ends relatively wide blade portions with digging edges extending substantially transverse to said arms, said arms being mounted for pivotal movement individually about an axis lying in a plane perpendicular to the axis of rotation of said set of arms so that said arms turn through an angle to dispose said blades at a digging angle with their digging edges lying in a plane substantially parallel with said shaft as they revolve through the soil and at a dumping angle as they are lifted from the soil wherein the digging edges lying in a plane substantially perpendicular to said shaft, the improvement comprising a scraper carried by said frame for cooperation with said set and being disposed to be engaged by the digging edge of each blade of said set as the respective arm is pivoted to its dumping angle so that the digging edge moves past said scraper substantially tangentially thereto.

2. In a rotary cultivator according to claim 1, said blades having substantially flat digging surfaces and said scraper being of a length to wipe said surfaces as they move transversely past said scraper.

3. In a rotary cultivator according to claim 2, said frame including a rear portion extending behind said set of arms and said scraper being mounted on said rear frame portion.

4. In a rotary cultivator according to claim 3, said scraper including a base portion secured to said frame and an angularly bent active portion engageable with said blades.

References Cited

UNITED STATES PATENTS

| 423,032 | 3/1890 | Deuscher et al. | 172—62 X |
| 1,304,838 | 5/1919 | Weston | 172—39 |
| 2,465,488 | 3/1949 | Sears et al. | 172—39 |
| 3,012,616 | 12/1961 | Horowitz | 172—94 |

ABRAHAM G. STONE, Primary Examiner.

WILLIAM A. SMITH III, Examiner.

A. E. KOPECKI, Assistant Examiner.